UNITED STATES PATENT OFFICE 2,688,685

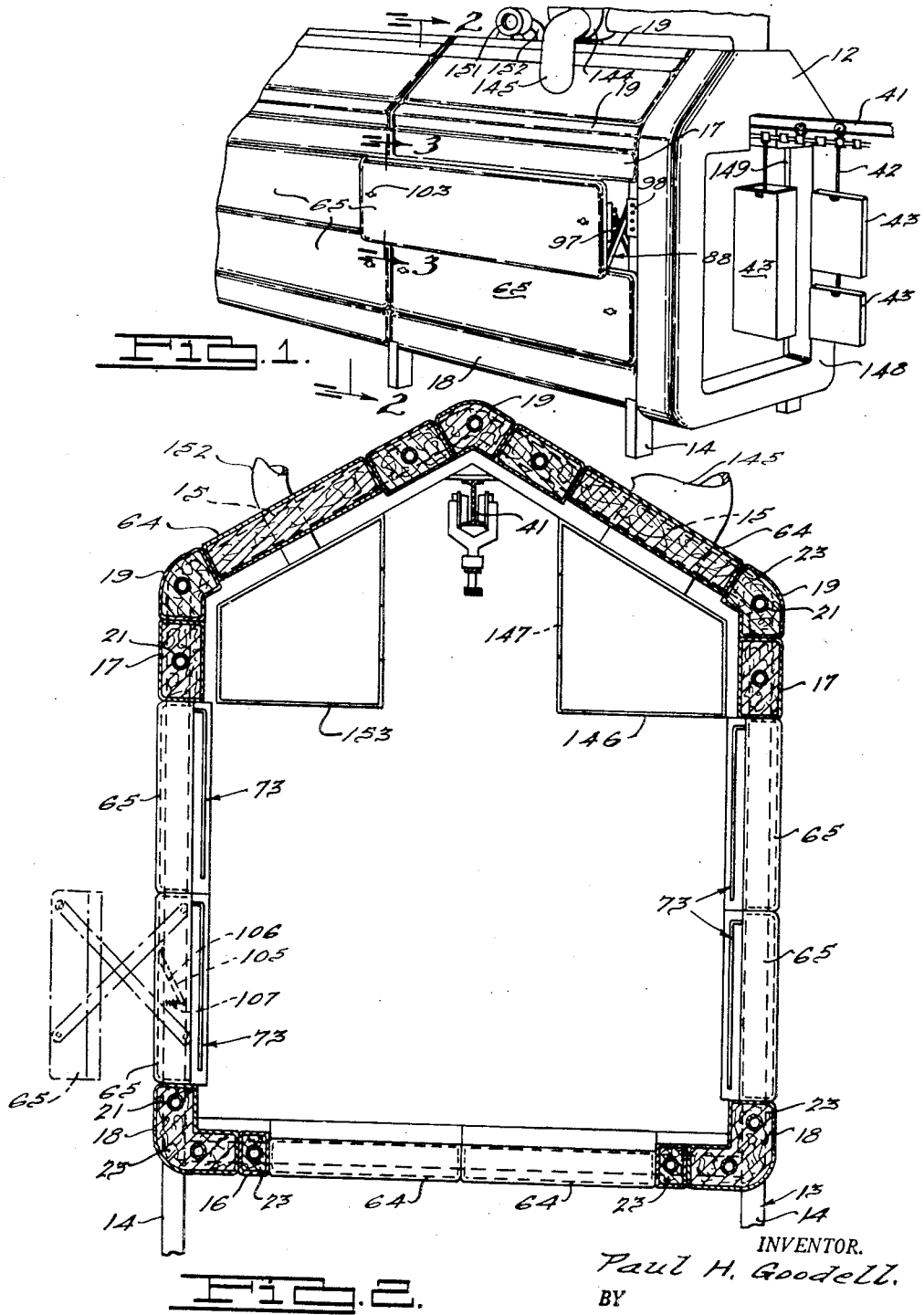

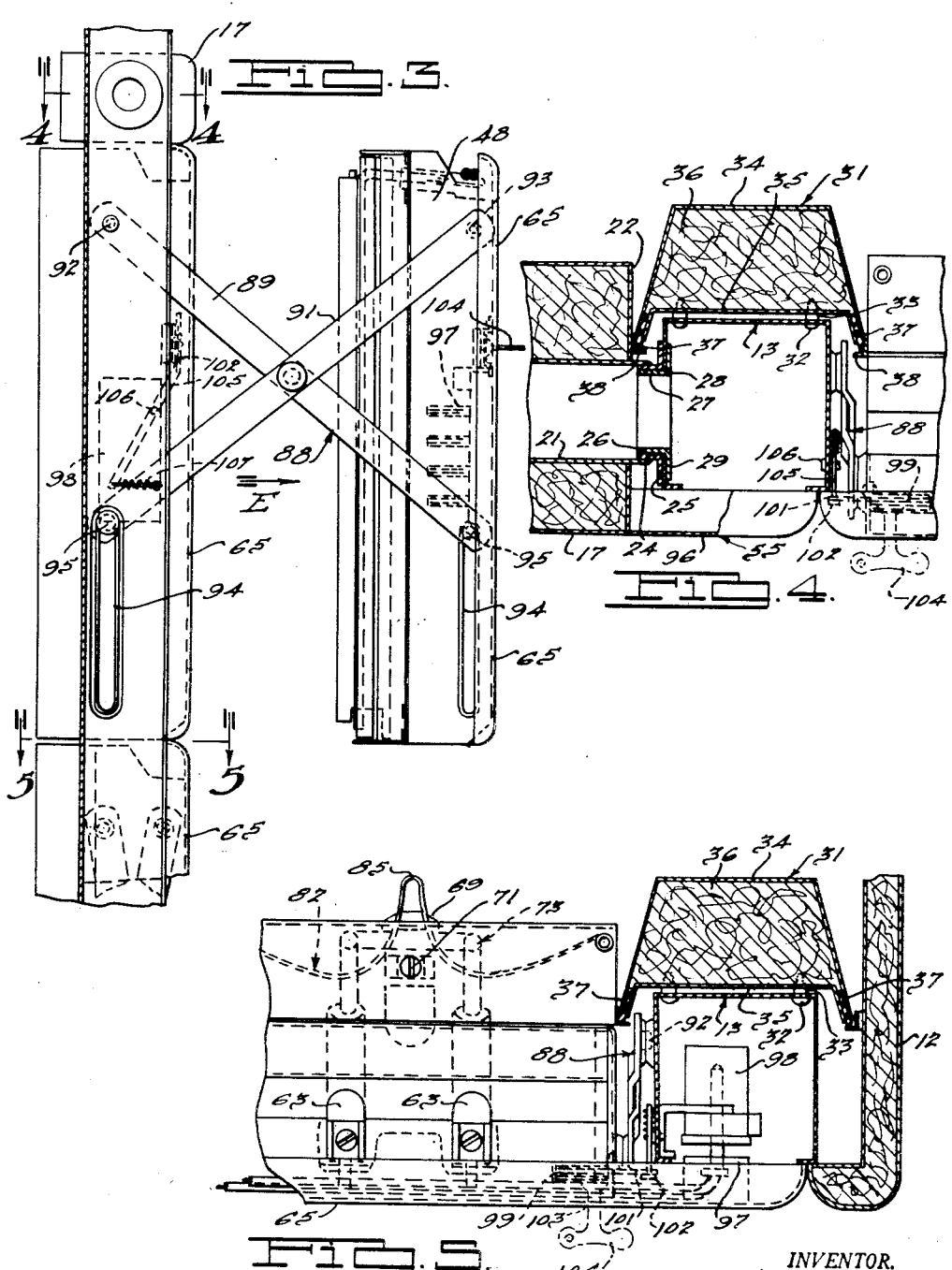

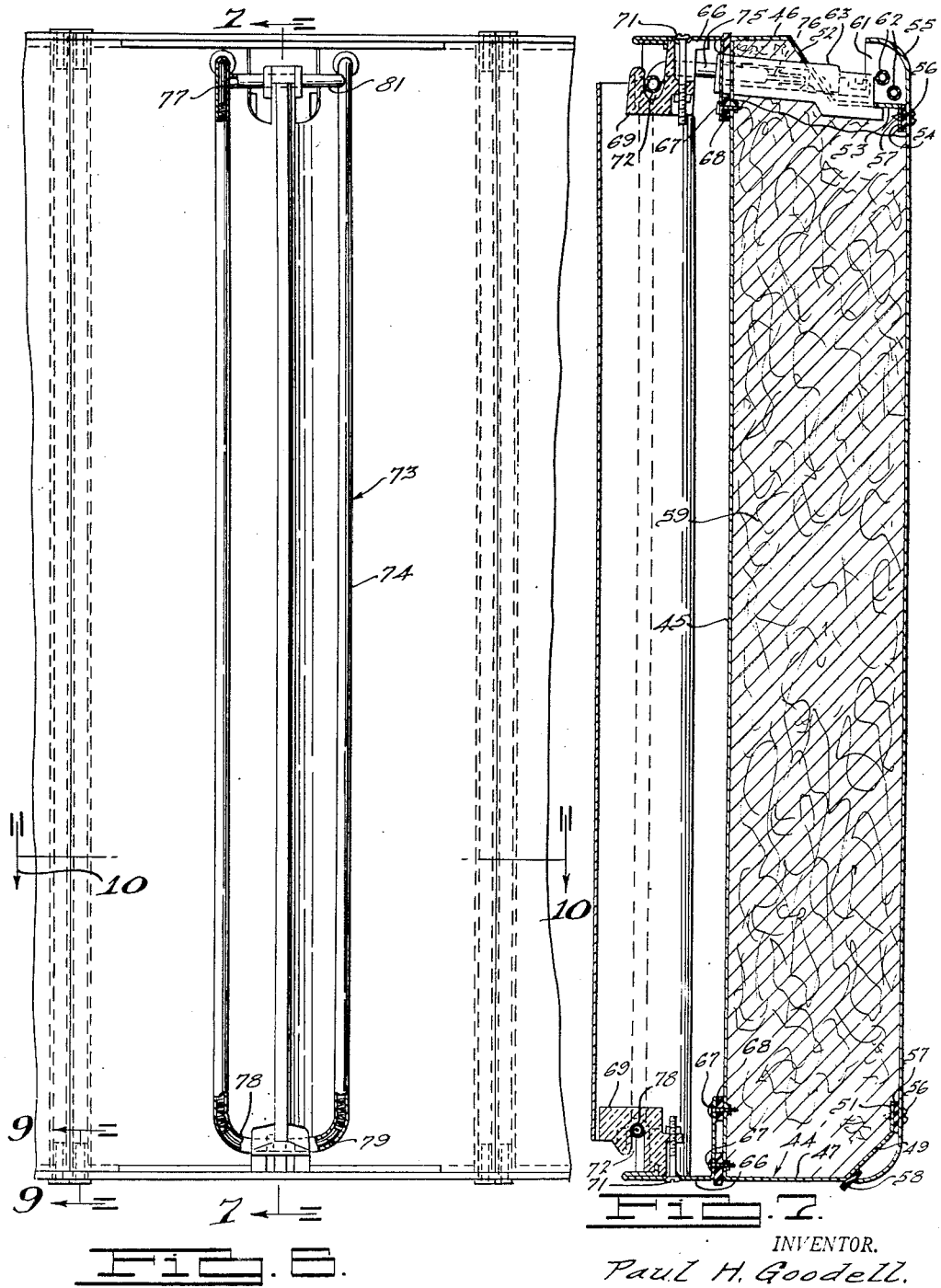

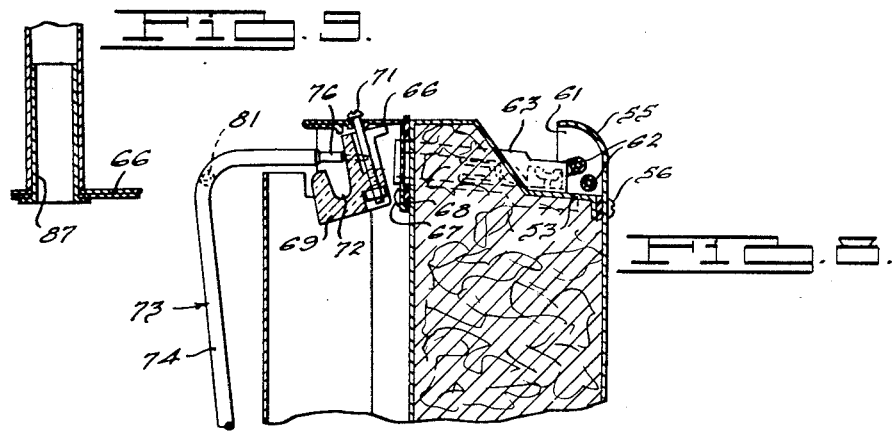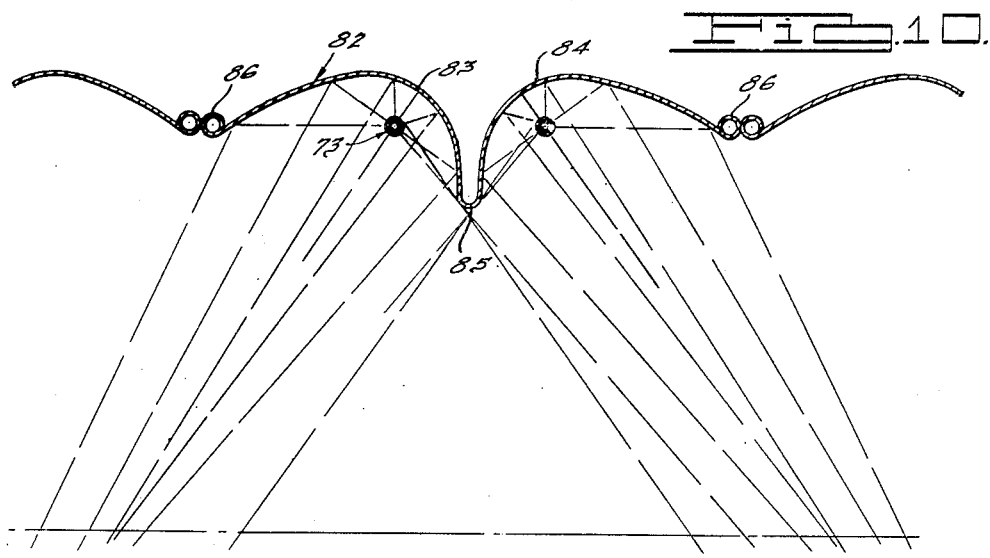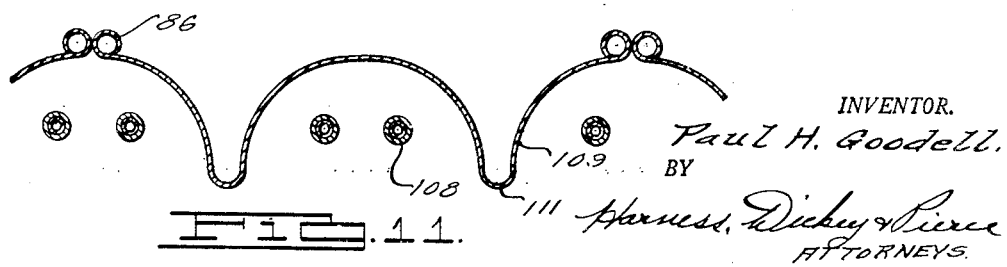

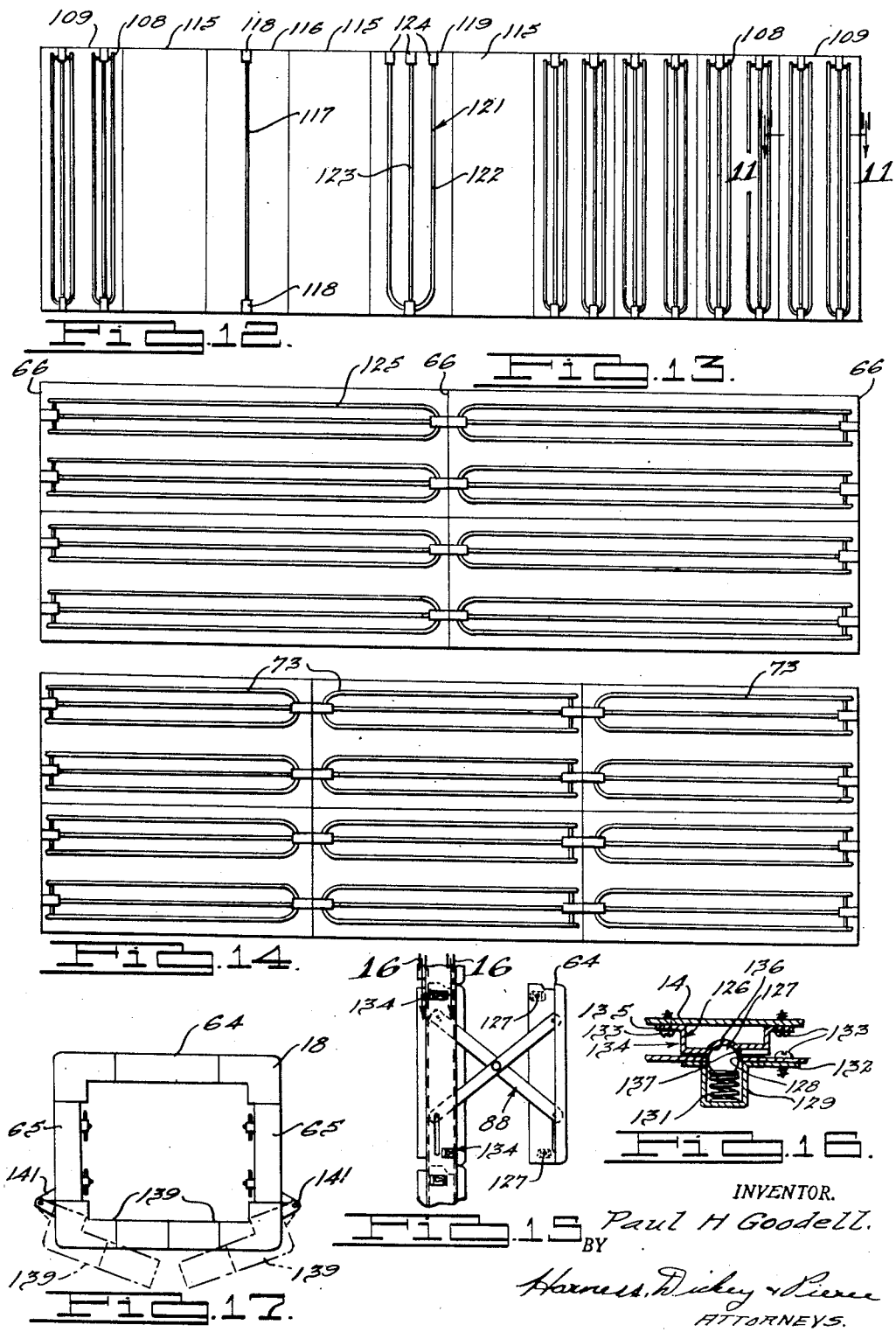

SHEATH-RESISTANCE HEATER AND PANEL SUPPORTING STRUCTURES THEREFOR WHICH ARE BUILT INTO HEATING DEVICES

Paul H. Goodell, Detroit, Mich.

Application October 29, 1951, Serial No. 253,700

23 Claims. (Cl. 219—35)

This invention relates to heating units, and particularly to a heating unit of the electric type, and devices containing such units.

Ovens, driers, booster heaters and the like heretofore have been constructed as special pieces of equipment for each application thereof, and were usually heated by a plurality of combustion burners or electric resistance heaters (open wire, ribbon or finned tubular types), infrared lamps, radiating glass plates or panels of heat-resistant fabric with internal resistance elements. All of these devices are fragile or require custom engineering and construction for each application, resulting in excessive maintenance and/or investment costs. Most of these devices utilize only one method of heat transfer (convection, radiant or conduction), while producing substantial amounts of energy in other forms which is generally not well employed, thus requiring higher energy input and excessive operating cost to obtain a desired end result.

The present invention overcomes these difficulties by providing a well-insulated convection enclosure from standard design components, the primary heating zone being surrounded with reflecting surfaces for effective radiant energy control and the whole being of nonfragile construction to assure long and dependable service life. To accomplish this objective, the heater supports, power supply system, and control of the thermal output from the heaters becomes an integral part of the oven wall or heating panel design and construction. Furthermore, the electrical supply system external to the heaters need not enter the heating zone, thus avoiding the use of special alloy materials, thereby permitting the use of ordinary low temperature electrical conductors.

Equipment so designed thus permits more complete use of the convection and radiant energy inherently produced by the heaters to balance the various requirements of industrial processing applications. Two or more forms of heat transfer are thus employed in a single oven or heating device with a high degree of uniformity and without many of the limitations occasioned by single energy transfer systems. For example, temperature elevation is obtained more rapidly and uniformly by first exposing the product to radiant energy at any desired heating rate without excessive heat loss to the air in contact with the product. Once the desired temperature is attained, the temperature may then be held with extreme uniformity by convection alone, this convection being derived as by-product energy from the radiant heaters, as recuperated energy from the products being heated at the end of the heating cycle, or from supplemental convection heaters installed in the air recirculating system of the oven.

To accomplish this objective, standard heating panels and structural elements are provided which permit a heating device of any length, width and height to be constructed from an assembly thereof. The wall panels are of unique construction embodying inner and outer formed sheets of metal which are secured together when separated by insulated material to prevent the passage of heat from the inner to the outer sheet by conduction. The sheets are spaced to form an enclosure in which an insulating material is retained to prevent the passage of heat through the panel by convection. Such panels may be employed as wall panels between the structural elements and are also employed as the supporting means for the heating assemblies. Any number of the heating assemblies may be mounted on a panel which is of substantial length, the number of heating assemblies employed depending upon the rate of heat transfer desired for the particular application.

Each heating assembly including a heating element and its associated reflector is mounted on the inner face of the panel by supporting rails which are secured to the top and bottom edges when the heating assemblies are mounted vertically or which are secured to the ends and centrally thereof when the heating assemblies are mounted horizontally. The heating element for the assembly comprises a resistance wire element with a terminal at each end made of a nickel alloy of such diameter as to prevent heating, and therefore provides cold terminals to which the electrical connections may be secured. The heating wire is encased in a hollow sheath and the wire and terminals are separated from the sheath by insulating material, such as magnesium oxide, as is the common practice in the art. The heating element is preferably of U-shape, having two straight portions extending at an angle from the terminals and joined by a web portion at the opposite end. The heating wire is coiled within the sheath except at the web portion where it is a straight section so as to reduce the heat at the web portion to a minimum amount. The heating element is attached to the supporting rails by slotted insulating members. An insulating member having a downwardly presenting slot is fixed to the bottom rail into which the web of the U-shaped heating element extends to a degree to permit a substantial expansion of the element without danger of the web moving out of the slot.

Insulated sockets are provided along the rail for receiving the terminal ends of the heating elements. A cross bar is provided between the open ends of the sheath adjacent to the terminal ends for the purpose of retaining the ends of the heating element in the sockets. The ends are disposed at an angle less than a right angle to the heating portion of the sheath and a slotted insulating element is carried by the rail which is adjustable by a screw for moving the slot over the cross bar of the sheath, to thereby prevent the terminals from moving out of the sockets. The sockets extend into a trough directly back of the front sheet of the panel through which the insulating conductors extend and are electrically connected to the sockets. Several conductors may be provided so that individual control can be maintained on a number of the different heating assemblies. Any type of circuit, series, parallel or series-parallel combination, may be employed to connect the sockets to the source of power. The covering on the conductors is heat insulating, which is protected by the insulating material between the trough and the inner sheet of the panel and the reflector forwardly thereof so that the cold terminals on the heating elements extend into cold sockets and there is no danger of the heat damaging the sockets or the insulating material of the conductors.

Longitudinally extended reflectors are provided for each of the heating elements, having a central portion which projects between segments of the elements so that neither segment will be subjected to the direct rays of the other. The reflectors are shaped to direct the back hemisphere radiation forwardly, along with the front hemisphere radiation from the heating elements. The maximum amount of radiation is preferably directed angularly so as to strike the ends and the adjacent surfaces of an object being heated. The intensity of the heat is regulated by the number of heating elements employed, by the wattage of the elements, and by the spacing of the elements relative to each other.

When the heating units are assembled in a device for performing an operation on an object, a conveyer system is often utilized for passing the object through the device. The heating elements are employed in a manner to heat the object to a desired temperature by radiation in a minimum of time and maintaining the temperature thereafter by convection heat which is retained within the insulated enclosure. The wall and heating panels may be mounted on pantograph supporting mechanisms so that they are moved outwardly away from the wall of the device for relieving internal pressure, inspection or repair. Each heating panel has its electric circuit provided with separable contacts which engage fixed contact members on the frame when the panels are closed. The danger of burns and electrical shock to a workman is thereby eliminated when the panels are drawn outwardly for inspection or repair. The panels are closed against the supporting structure and are retained by a releasable latch which permits manual opening and opening by an internal pressure created by an explosion occurring within the enclosure. All of the parts are made of light metal construction which is insulated and which therefore does not store a substantial amount of heat to cause damage to the object being treated in case of breakdown of the conveyer when the current to the heating elements is shut off to stop further radiation. A ventilating system may be provided with the device for withdrawing objectionable by-product vapors, and a circulating system may be utilized for circulating the air within the device to prevent the stratification thereof.

Accordingly, the main objects of the invention are: to provide a heater for a heating assembly which has long life, is rugged and not easily broken; to provide a heating panel of unit construction having inner and outer walls insulated from each other which is capable of supporting a variable number of heating assemblies; to construct a heating device from a number of panels and variable shaped structural elements which are readily assembled along with heating panels which are attached thereto by pantograph supporting mechanisms which permit the heating panels to be moved outwardly for inspection; to provide a latch and a removable key on the pantograph-mounted panels, which key, when inserted therein, forms a handle for pulling the panel outwardly and which releases the latch which is also released when the pressure from an explosion forces the panel outwardly; to construct a heating device out of insulating panels which prevents the loss of heat by convection or conduction and which has heating assemblies of such number as to quickly raise the temperature of the object being heated to a desired temperature which is maintained thereafter either through additional heating elements or, preferably, by the convection flow of heat from the air within the device; to provide blower systems for a heating device by which the contaminated air is removed to the atmosphere, the remaining air being continuously circulated to prevent stratification and provide the medium for transferring heat by convection, and, in general, to provide a standard panel and assemblies thereof to form heating devices which are simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken, perspective view of a heating device, embodying features of the present invention;

Fig. 2 is an enlarged, sectional view of the structure illustrated in Fig. 1, taken on the line 2—2 thereof;

Fig. 3 is a broken end view of a portion of the device illustrated in Fig. 1, as viewed from line 3—3 thereof;

Fig. 4 is an enlarged, sectional view of the structure illustrated in Fig. 3, taken on the line 4—4 thereof;

Fig. 5 is an enlarged, broken sectional view of the structure illustrated in Fig. 3, taken on the line 5—5 thereof;

Fig. 6 is an enlarged, broken view of a portion of the structure illustrated in Fig. 3, as viewed from the point E thereof;

Fig. 7 is a sectional view of the structure illustrated in Fig. 6, taken on the line 7—7 thereof, with the heating assembly in secured relation to the panel;

Fig. 8 is a broken view of the structure illustrated in Fig. 7, with the terminals of the heating element in disconnected position;

Fig. 9 is an enlarged, sectional view of the structure illustrated in Fig. 6, taken on the line 9—9 thereof;

Fig. 10 is an enlarged, sectional view of the structure illustrated in Fig. 6, taken on the line 10—10 thereof;

Fig. 11 is a view of a modified heating assembly, similar to that illustrated in Fig. 10, showing another form which the invention may assume;

Fig. 12 is a front view in elevation of a series of reflectors and heating assemblies mounted on the inner surface of a supporting panel;

Fig. 13 is a view of structure, similar to that illustrated in Fig. 12, with the heating assemblies disposed horizontally;

Fig. 14 is a view of structure, similar to that illustrated in Fig 13, showing three sets of heater assemblies mounted on a panel;

Fig. 15 is an end view of structure, similar to that illustrated in Fig. 3, showing a modified form thereof;

Fig. 16 is an enlarged, sectional view of the structure illustrated in Fig. 15, taken on the line 16—16 thereof, and Fig. 17 is a top view of a heating enclosure, similar to that illustrated in Fig. 2, showing a further form thereof.

Referring to the figures, a heating device or oven 12 is made up from a plurality of hollow frame members 13 of channel section which may be of any shape conforming to the shape of the device to be constructed. In the figures, the frame members 13 embody vertical standards 14 which are joined together at the top by angularly disposed sections 15. The standards and sections may be of unit construction or may be made of parts which are welded or otherwise secured together. A plurality of structural panels 16, 17, 18 and 19 are provided of standard length to extend between the frame members 13. Each of the structural panels is formed of a shell of metal closed at both ends and having one or more tubular elements 21 extending therethrough and through the walls 22 at each end thereof. The interior of each structural panel is filled with insulating material 23 and the inner and outer walls thereof are maintained out of contact by insulating material. The ends of the tubular elements 21 have a sleeve 24 welded thereto, to the end of which a laterally extending flange 25 is provided. The inner surface of the sleeve 24 is threaded at 26 in which the exterior threads on a sleeve 27 engage when screwed therein. The sleeve extends through an aperture 28 in the frame member 13 and a flange 29 on the sleeve 27 abuts the inner surface of the frame member wall to clamp the wall against the flange 25 on the sleeve 24. The frame members, as well as the tubular elements 21, form a conduit for the electric circuits which are completely insulated.

The frame member on the interior face has insulating members 31 secured thereto by screws 32 which are separated therefrom by insulating washers 33 through which the screws extend. The element 31 is made from an outer angular sheet metal casing 34 and a similar inner telescoping casing 35 in which insulating material is provided. The adjacent edges of the members 34 and 35 are separated by insulating plates 37 which extend beyond the ends of the metal thereof and separate the metal parts against the passage of heat by conduction. The ends of the insulating plates 37 engage angle strips 38 which are provided along the end members 22 of the panels and structural elements, and the interior of the device is insulated from the exterior thereof.

In the heating device herein illustrated, all of the panels and structural elements are substantially 7 feet long and vary in width and shape to build any desired type of furnace. For example, the structural elements 16 are substantially 4" wide and 6" thick, the elements 18 have 12" arms disposed at right angles to each other to form corners, the structural element 17 is 11" long, the 120° angle elements 19 have the angularly disposed portions approximately 6" in length, and the panels 15 are substantially 26" in height. From these elements a square type of oven or an oven with angularly disposed top walls, as illustrated at the top of Fig. 2, may be formed of various heights and in various lengths. A tall, narrow assembly of the elements may be utilized for continuously drying fabrics, paper and the like, by changing the shape of the frame member. A series of the frame members, as illustrated in Fig. 1, may be utilized for constructing a device of any length.

In the device herein illustrated, a conveyer 41 is provided at the top, having hooks 42 extending downwardly therefrom on which objects 43 to be processed are suspended for passage through the interior of the device at a predetermined rate. Other types of conveyers may be utilized, such as rollers on the floor on which the objects to be heated are advanced. It will be noted that the frame member is preferably made of channel section, having the outer face open so that the interior of the members is exposed when the panels are moved outwardly therefrom. This permits access to the wire within the frame member and also the application of a spanner wrench for tightening the sleeves 27 for securing the panel sections to the frame member.

The panel 15 is made up of a sheet metal box-like element 44, having an inner face 45, a top wall 46, a bottom wall 47, and end walls 48. The outer edges of the element 44 at the sides and bottom are flanged at an angle at 49 and further flanged at 51 parallel to the face 45. At the top the wall 46 slopes inwardly at 52, then outwardly at 53, and is flanged at the end at 54 in the plane of the flange 51. The flanges 51 and 54 form a surface to which the outer sheet member 55 is secured by a plurality of screws 56 separated by insulating strips or washers 57, with an insulating strip 58 provided between the end of the curved edge portion of the sheet and the walls 47. The insulation pieces 57 and 58 prevent the passage of heat by conduction from the inner face 45 of the panel to the outer sheet member 55 thereof. Between the panels insulating material 59 is packed to prevent the passage of heat by convection through the panel, the material being glass wool or other like known heat insulating material. The sloping wall 52 forms a channel or trough 61 along the top edge of the panel forwardly of the insulation, so that the conductors 62 disposed therein are protected from the heat within the device.

A plurality of insulated sockets 63 are provided in pairs, extending through the panel at the top into the trough 61, having terminal ends to which the conductors are attached. It will be noted that the receptacles are disposed at an angle to the front face of the panel for purposes which will be explained hereinafter. The panels may be employed as wall elements, as illustrated at 64 in Fig. 2, or may be employed as the support for the heater assemblies, as illustrated at 65. When so employed, the heating assemblies illustrated in Figs. 6, 7 and 8 are attached to the forward face 45 of the panels. Angle rails 66 are secured to the inner face 45 of the panel assembly along the top and bottom edges thereof by bolts 67, being separated from the face by insulating strips 68.

Insulating supporting elements 69 are secured to the channel strips 66 by bolts 71. The insulating elements 69 have slots 72 therein for locking the heating elements in position. The heating element, as illustrated in Figs. 6 and 7, embodies a sheath-resistance heater 73 comprising a U-shaped tubular sheath 74 having the free ends reversely bent rearwardly at 75 at an angle of substantially 81°, for a purpose which will be referred to hereinafter. Terminals 76 of nickel alloy extend into the end portions 75 of the tubular sheath 74 and are insulated therefrom. Each of the terminals is connected to an end of a resistance wire 77 which is coiled in the parallel straight portions of the sheath to provide maximum heat areas therealong. At the transverse web portion 78 of the tubular element 74, the heating wire 77 is left straight, as at 79, to provide a relatively cool area at the web portion. The web portion 78 extends within the slot 72 of the insulating element 69 and a tubular cross bar 81 is welded between the free ends of the straight portions near the terminal in position to be engaged within the slot 72 of the insulating member 69 at the top of the panel. The portions of the heating element adjacent to the cross bar 81 and rearwardly thereof to the terminals and the web portion 78 containing straight wire portions are substantially cool as compared with the parallel rod portions containing the coiled wire which provides the maximum amount of heat output.

The heater is nonfragile, of metallic type capable of long life operation at high temperatures to assure maximum conversion of electrical energy to thermal energy, principally in the form of electromagnetic radiation in the so-called infrared region. The heater is capable of withstanding both high thermal and mechanical shock and has no live exposed electrical parts, which provides protection against shock and permits its support to be of either insulating or noninsulating material. The heater may be provided with "cold" areas for effective mechanical support without excessive heat losses to the supporting media and to its power supply system. The hot sections may be located in optical control equipment embodying reflectors for uniform delivery of thermal energy to monoplane surfaces parallel to the plane of the heaters or over three dimensional surfaces in any plane to the plane of the heaters. With a fixed power supply, the live or hot segments of the heater produce a uniform output of radiant energy, not being dependent on user maintenance, mechanical or electrical features which limit performance dependability, as occurs with many competitive types of heaters; the sheath also burning itself free of contaminating materials which may impinge thereon.

When the heating element 73 is to be assembled upon the panel, the web end 78 is inserted within the slot 72 of the bottom insulating member 69 and drawn upwardly in a position to have the terminals 76 of the heating element 73 aligned with the sloping receptacle 63. The terminal ends are inserted within the sockets on an arc scribed from the cross bar 81 which falls on the sloping terminals and sockets and permits the engagement thereof. The screw 76 of the insulating element 67 having been previously loosened to permit the cross bar 81 to pass therebeyond in a position to be engaged within the slot 72 thereof, is thereafter tightened to draw the insulating member from the position as illustrated in Fig. 9 to the position as illustrated in Fig. 7. A substantial degree of expansion, which occurs longitudinally of the heating element 73, is free to take place without straining any of the supporting elements, and the slots are of such depth as to prevent the expansion from moving the web portion 78 from the slot. When the panels are mounted at the top of the device to have the heating element 73 face downwardly, there will be no danger of the heating element falling out of the support or of the terminal ends becoming disconnected.

To obtain the ultimate degree of heating from the heating element 73 and to control the direction of the heat, reflectors 82 of predetermined shape are provided for the assembly. This is disclosed clearly in Fig. 10, wherein sheets of highly reflective material are illustrated as being formed in two like halves 83 and 84 which are of the opposite hand. The halves are joined together by an extending portion 85 which projects beyond the heating element 73 to prevent direct heat from either portion from striking the other. The forwardly directed rays from the heating elements pass directly onto the object to be heated as it is moved through the device, while the rearwardly directed rays are reflected by the respective parts 83 and 84 of the reflecting element 82 in a predetermined angular direction.

The ends of the sections 83 and 84 are coiled into tubular shape, as at 86, for the purpose of providing strength and to form a support when telescoped on the tubular supporting elements 87 mounted on the angular supporting rail 66 of the heater assembly. A line of heat rays produced by each branch of the heating element 73 is reflected throughout the height of the reflecting element 82 and these rays are directed at an angle to cooperate with the directly issuing rays to strike the object not only on the adjacent facing surface but also on the end surfaces thereof. The radiant heat thus directed onto the object to be heated raises the temperature thereof in a minimum of time as the concentration of heat is desirable at the initial point of passage of the object through the device. After the temperature is raised, it is usually maintained by the convection flow of heat in the area within the device beyond the area occupied by the heating elements. If necessary, one or more heating elements may be provided at points along the length of the device beyond the area containing the heating assemblies. The heat on the tubular portion 74 of the heating element burns off any accumulation of residue thereon, and the heating elements are thereby self-cleaning. The intense heat from the elements maintains the temperature of the reflectors substantially above the dew point of the residue gases which are thereby prevented from condensing on and marring the reflecting ability of the reflector surfaces.

Each of the panels 65 is mountable on a pair of pantograph supports 88 which have the top ends of the pivoted arms 89 and 91 directly pivoted to the wall of the frame members 13 by a pivot 92 and to the side 48 of the panel 65 by a pivot 93. Slots 94 are provided in the wall of the frame member 13 and in the wall 48 at each end of the panel to receive the rivets 95 in the opposite end of the arms 89 and 91. The pantograph supports permit the heating panels to be moved outwardly from the assembly of panels and sections for inspection and repair. The panel is so constructed as to have the adjacent end portion 96 of the outer sheet member 55 extend over the open face of the supporting member 13 so that when the panel is drawn outwardly, the interior of the member is exposed. Within the portion 96, a terminal block 97 is mounted, to the terminals of which the conductors 62 are secured. A socket element 98 is mounted within the channel supporting member 13 in a position to be engaged by the terminals of the block 97 when the panel 65 is in closed position and to be separated therefrom when the panel is moved to open position. Thus, when the panel is in open position, all of the circuits thereof are dead so that there is no danger of shock or burn to a workman after the heating element 73 is cooled. After inspection and repairs it is only necessary to push the panel forwardly into closed position on the pantograph supports to move the terminals of the block 97 into engagement with the sockets on the block 98 to complete a circuit to the heating element 73.

A lock 99 is secured to each side edge of the panel, having a lock bar 101 which engages a detent 102 when in panel-locked position. A slot 103 is provided in the face of the panel 55 at each end for the reception of a key 104 by which the latching bar 101 is actuated to closed and open positions. When in open position, a key 104 is retained securely within each lock and forms handles by which the panel may be pulled out on the pantograph supports 88. When moved to closed position, the keys are turned to lock the panel in closed position and can only be removed when the lock bar 101 is disposed outwardly in position to engage the detent 102.

The detent 102 is disposed on the end of a lever 105 which is pivoted to the wall of the supporting member 13 by a pivot 106. A spring 107 of predetermined strength is secured to the lower end of the lever 105 for retaining the detent in panel-latching position. The strength of the spring is such that should an explosion occur within the device, the force on the inner surface of the panel 65, localized on the latch bars 101, would cause the lever 105 to pivot in a counter-clockwise direction, thereby releasing the latch bar and permitting the panel to be blown open, relieving the device of the pressure and any resulting damage which would otherwise result therefrom. It is to be understood that panels 64 which do not have the heating assemblies attached thereto may also be mounted on the pantograph supports 88 and be latched in position by the locks 99 in a manner as above indicated, to be operated manually when the furnace is to be repaired or cleaned, to be opened by pressure from within the device when an explosion occurs therein.

In Fig. 11, a further form of reflector is illustrated when a more concentrated degree of heat is desired and when the heating elements 73 are stacked together as closely as possible on the inner face of the panels. In this arrangement, the two adjacent heating bars 108 of adjacent heating elements 73 are disposed within a curved reflecting section 109 of the reflector, while the other bar thereof is disposed within the next adjacent curved portion 111 of the reflector spaced from the bar of the next adjacent heating element. In this arrangement, substantial cooling by the rapid passage of the object being heated prevents the adjacent bars 108 from burning out. As long as the heat from the bars 108 is absorbed rapidly in this manner, there is no danger of damage to the heating elements. Such reflector members and concentrated arrangement of the elements are only employed when a large amount of concentrated heat is desired and can be absorbed at all times.

Thus, concentrated heat may be applied to an object being heated through the selected location of the panels 65 in the assembly to form the device and the location of the heating assemblies upon the panels. Any number from one to eight of the heating assemblies of the type illustrated in Fig. 10 or from one to twenty of the type illustrated in Fig. 11 may be applied to each panel and the number employed depends upon the degree of heat required at the particular location of the panels. As indicated above, it is within the purview of the invention to apply the heating elements horizontally on the face 45 of the panel by employing vertically disposed angle supporting rails 66 along the ends and through the center of the panel on which the insulating elements 69 are mounted for securing the heating element 73 of greater length horizontally thereon, as will be explained hereinafter. While the heating elements are illustrated as having parallel bars, it is to be understood that the bars may be formed into any shape and even coiled where desired so long as the two adjacent terminal ends are disposed in a manner to be connected to the insulating sockets 63 disposed in pairs along the panel.

Referring to Fig. 12, a number of heating assemblies are illustrated, mounted on a panel of conventional dimensions. A number of closely disposed heating elements 108 and the associated reflectors 109, as illustrated in Fig. 11, are mounted on the right-hand end of the panel, while monoplane reflectors 115 are spaced therefrom and from each other in areas where a less amount of heat is provided. An assembly of the heating elements 108 and reflector 109 is illustrated at the left-hand end to illustrate an arrangement of heater assemblies when concentrated heat is required at spaced points. On the reflector 116 a single length of sheath-resistance heater 117 is mounted on sockets 118 located at the top and bottom of the panel, the sockets being movable to permit the expansion which occurs to the heating element. On the reflector 119 a heating element 121 is provided having a U-shaped portion 122 and a central section 123, with three terminal ends 124. The terminal ends are similar to the terminal ends 76 hereinabove described for connection in sockets 63 when the heating element 121 is secured on insulating elements, similar to insulating elements 69 illustrated in Fig. 7, for retaining the heating element fixed to the supporting rails. From this illustration it will be apparent that the panel may be provided on its inner surface with reflectors 115 mounted on the rails 66 by the tubular elements 87 provided therealong, or any number of the heating assemblies 108, 109, or 73 and 82, or the single rod heater 117, or the three-rod heater 121 may be employed at any one of the reflector areas 109, 115, 116 or 119. In this manner, no radiant heat, except reflected heat, is provided by the panel when the blank reflector units 115 are employed, or reflectors having the associated heaters of any type applied thereto may be located at any point along or throughout the length of the panel to provide the degree of heat required over any area thereof.

It will be noted from Fig. 7 that the reflector is spaced from the front surface of the panel so that air is trapped between the panel and the reflector, which thereby further insulates the outer surface of the panel from the heat generated by the heating elements.

In Fig. 13 a panel is illustrated having a rail 66 provided at opposite ends and also through the center thereof for supporting the insulators 69 and heating elements 125 which are similar to the heating elements 108 with the exception that they are of greater length. The construction and conductor connections are otherwise the same as those described above with regard to the structure illustrated on the device of Fig. 2.

In Fig. 14 an arrangement of heating assemblies is illustrated, wherein the units 73 are of standard length and disposed in three sections when mounted upon the inner surface of the panel in aligned horizontal relation to each other. The various assemblies of heating elements on the panel, as illustrated in Figs. 12, 13 and 14, show the flexibility in providing heated areas of different degrees over the entire panel surface or over a portion thereof.

The heating elements may be constructed to have any desired rating. Satisfactory heat control was obtained when the heating elements 73 were supplied in two ratings, one operating at a temperature of 1500° F. requiring 2000 watts at 230 volts (44 watts/sq. in.); the other operating at the same temperature requires 2000 watts at 280 volts. This latter rated heating element, when operated at 230 volts, requires 1350 watts (30 w./sq. in.) and delivers heat at a temperature of 1150° F. The heating element 125 operates at 900° F., requiring 1000 watts at 230 volts (14 watts/sq. in.). By selecting any number of the heating elements or a combination thereof, zones of heat may be provided at selected points on the panel to meet the heat requirement, or the same heat intensity may be provided throughout the length of the panel. For example, when 20 of the heating elements 73 having a 2000 watts rating, are secured across the face of the panel, two and two-thirds kilowatts per square foot are provided for the 15 square feet of panel surface. From this maximum any lower degree of heat may be provided for the panel surface or selected areas thereof. In this manner extreme flexibility in delivered heat is obtained for a panel and for the assembly of panels. It is to be understood that ratings other than those specifically mentioned by way of example may be employed for the heating elements herein illustrated and described.

A wall or heating panel 64 or 65 is mounted on a free moving pantograph mechanism from the oven frame in the side walls or floor of the oven. Such panels relieve the pressure from an internal explosion without the necessity for lifting the weight of the panel. By thus reducing the force required to open the explosion vents, and increasing the area available for venting, explosive pressures and consequential damage can be greatly reduced without impairing normal operation of the heating device. In Fig. 15 a pantograph supported panel 64 is illustrated, having at each end thereof one or more ball latching assemblies 126. This embodies a ball 127 which may be mounted in any manner at the edge of the panel but herein is illustrated as extending through an aperture 128 of smaller diameter than the ball so as to retain the ball in a manner to prevent it passing therethrough. A flanged cup 129 supports a spring 131 which engages the ball 127 and forces it as far as possible out of the aperture 128. The flange 132 on the cup is secured to the end walls of the panel by suitable screws 133. A cuplike element 134 is secured to the wall of the frame section 14 by screws 133 extending through a flange 135 provided about the edge thereof. The top surface of the cup-shaped element 134 has a recess 136 of spherical section for receiving the ball and maintaining the panel in closed position. A slot 137 may be depressed in the surface for guiding the ball into the recess. A detachable handle is preferably provided, similar to the key 104, which may be attached to the panel for pulling the panel outwardly on the pantograph support with sufficient force to release the ball 127 from the recess 136. Any pressure developing within the enclosure will press against the inner surface of the panel, and when of sufficient intensity, will move the panel outwardly on the pantograph support after releasing the balls from their recesses. In this manner, as destructive pressures develop within the enclosure, they are relieved through the opening movement of one or more of the panels before any damage occurs. While the ball latching mechanism is herein illustrated as being applied to a panel without the heater assemblies thereon, it is to be understood that the same arrangement may be applied to panels with heater assemblies thereon as the ball latching mechanisms function the same on either type of panel.

In Fig. 17 a further form of the assembly of panels is illustrated, that wherein the heating panels 65 are disposed vertically and secured in fixed position to the corner panels 18 which are spaced by a fixed panel 64. A pair of movable panel assemblies 139 is mounted on the panel 65 or on an adjacent frame by hinged members 141. The hinged panel assemblies 139 may be swung outwardly on the hinged supports 141 to permit the heating assemblies to be inspected and repaired. Separable contacts 97 and 98 may be provided on the engaging walls of the panels 65 and 139 for interrupting the flow of current to the heating elements in the manner as explained hereinabove. The panel assemblies 139 may be latched in position by the ball latching assemblies 126 illustrated in Fig. 16 so that they may be swung open by any pressure developed within the enclosure due to explosion or the like. It is to be understood that certain panels of the enclosure illustrated in Fig. 2, having heating assemblies thereon, may be disposed in fixed relation and panels without heating assemblies, which are mounted adjacent thereto on pantograph supports, may be moved outwardly under the impact of the pressure of an explosion within the enclosure or manually to permit the heating assemblies on the adjacent fixed panels to be inspected or repaired.

Referring to Fig. 1, a blower 144 is illustrated connected through a conduit 145 to a duct 146 within the enclosure for drawing air through an aperture 147 in the side wall thereof and recirculating the air through the duct 148 provided on the forward end of the assembly. The air passes from the inner periphery of the central opening defined by the duct 148 through the space 149 and across the central opening which is sealed thereby against a flow of air through the device from one to the other end thereof. A second blower 151 is connected through a conduit 152 to a duct 153 which draws off by-product vapors within the enclosure and discharges them to atmosphere. The continuous circulation of air within the enclosure by the blower 144 prevents the passage of air therethrough and also prevents the stratification of the air and maintains it in contact with the objects being treated for heating the object and for extracting heat therefrom before the heated object passes from the device.

The control of the temperature of the heating elements in the present arrangement is exceedingly simple and accurate. Heretofore the temperature of some ovens was regulated by controlling the temperature of the air therein. In other ovens, the voltage to the heaters was regulated to vary the resulting temperature. Control was also provided by a current interrupter which varied the wattage input to heaters through the continuous interruption of the current. In the present arrangement, a system is employed for controlling the density of the energy delivered to the products by optical dispersion of the radiant energy from several heating elements with associated electrical control of these elements. By thus integrating the optical and electrical design, broad variations in energy density may be produced, with the heaters always operating at full or optimum output. In such an arrangement, alternate heaters are energized or de-energized through different electric circuits which are controlled from automatic temperature control equipment having temperature-sensing elements within the heating zone. In addition to the density control provided by the location of the heating elements and the shape of the associated reflectors, convection heating, as pointed out hereinabove, supplements the radiant heat to maintain the temperature of the product after the optimum temperature is reached. This makes use of the heated contained air and avoids the necessity of employing additional heating elements and the cost of their operation. It is to be understood that the heating elements themselves are not limited in any manner in physical size, wattage rating and the like, and that such heating elements may be of any shape from a single bar type having a pair of terminals to multiple bar types having a plurality of terminals.

What is claimed is:

1. A heating assembly including, in combination, an insulated panel made of spaced sheet members forming an enclosed area filled with insulating material, a plurality of sockets mounted on said panel rearwardly of the face on which heating elements are supported, a heating element of the sheath-resistance type having terminals at the ends thereof insertable in said sockets, rails supported on opposite edges of said face of the panel, insulating elements supported on said rails and engaging said heating elements and maintaining the terminals thereof in said sockets, tubular elements extending from said rails, and a reflector having tubular edge portions telescoping over said tubular elements to be supported thereby in desired relationship to said heater element.

2. A heater unit including, in combination, an insulated panel, a pair of sockets supported on one edge of said panel, a hairpin-shaped heater element of the sheath-resistance type having the adjacent ends bent rearwardly and provided with terminals which extend through the front face of the panel into said sockets, and means engaging said heater element and retaining it against removal while permitting substantial expansion thereof, said panel having a trough along the edge in which said sockets extend for engagement with the conductors therein for insulating the conductors from the heat from the heater element.

3. A heater element of the sheath-resistance type, comprising a hairpin-shaped sheath having the ends adjacently disposed and bent at an angle to the main hairpin-shaped portion thereof, a coiled resistance wire within the sheath having straight sections at the ends and at the U bend of the hairpin portion, terminals connected to the straight end sections of the resistance wire, and insulating material insulating the wire and terminal from the sheath.

4. A heater element of the sheath-resistance type, comprising a hairpin-shaped sheath having the ends adjacently disposed and bent at an angle to the main hairpin-shaped portion thereof, a coiled resistance wire within the sheath having straight sections at the ends and at the U bend of the hairpin portion, terminals connected to the straight end sections of the resistance wire, insulating material insulating the wire and terminal from the sheath, and a cross bar welded between the sheath portions near the bent ends thereof for retaining the ends in fixed spaced relation to each other.

5. A heater element of the sheath-resistance type, comprising a hairpin-shaped sheath having the ends adjacently disposed and bent at an angle to the main portion thereof, a coiled resistance wire within the sheath having straight sections at the ends, terminals connected to the straight end sections of the resistance wire, insulating material insulating the wire and terminal from the sheath, a cross bar welded between the sheath portions near the bent ends thereof for retaining the ends in fixed spaced relation to each other, a support for said element comprising a pair of spaced slotted insulating element, with the slots oppositely presenting and with one of the insulating elements movable toward and away from the other, the slot in one of the insulating elements receiving the cross bar, the slot in the other insulating element receiving the remote end portion of the heating element, said heating element being locked in the slots when the movable insulating element is moved relative to the other for securing the heating element against removal while permitting substantial expansion thereof.

6. A heater element of the sheath-resistance type, comprising a sheath formed to have the ends adjacently disposed and bent at an angle to the main portion thereof, a coiled resistance wire within the sheath having straight sections at the ends, terminals connected to the straight end sections of the resistance wire, insulating material insulating the wire and terminal from the sheath, a cross bar extending between the sheath portions near the bent ends thereof for retaining the ends in fixed spaced relation to each other, a support for said element comprising a pair of spaced slotted insulating elements in the slot in one of which the cross bar is disposed, in the slot of the other of which a remote portion of the sheath is secured to lock the element on the insulating supports against removal while permitting substantial expansion thereof, spaced rails for supporting said insulating elements, tubular members extending from said rails, and a reflector element having tubular end portions engaging said tubular members.

7. A heater element of the sheath-resistance type, comprising a sheath formed to have the ends adjacently disposed, a coiled resistance wire within the sheath having straight sections at the ends, terminals connected to the straight end sections of the resistance wire, insulating material insulating the wire and terminal from the sheath, a cross bar extending between the sheath portions near the ends thereof for retaining the ends in fixed spaced relation to each other, a support for said element comprising a pair of spaced slotted insulating elements in the slot in one of which the cross bar is disposed, in the slot of the other of which a remote portion of the sheath is secured to lock the element on the insulating supports against removal while permitting a substantial expansion thereof, spaced rails for supporting said insulating elements, tubular members extending from said rails, and a unit reflector element having tubular end portions secured to said tubular members, said reflector having curved portions which extend around sections of said heating element and which has a projecting portion which extends therebetween for protecting the one heating element section from the direct rays of the other section thereof.

8. A heater element of the sheath-resistance type, comprising a sheath formed to have the ends adjacently disposed, a coiled resistance wire within the sheath having straight sections at the ends, terminals connected to the straight end sections of the resistance wire, insulating material insulating the wire and terminal from the sheath, a cross bar extending between the sheath portions near the ends thereof for retaining the ends in fixed spaced relation to each other, a support for said element comprising a pair of spaced slotted insulating elements in the slot in one of which the cross bar is disposed, in the slot of the other of which a remote portion of the sheath is secured to lock the element on the insulating supports against removal while permitting a substantial expansion thereof, spaced rails for supporting said insulating elements, tubular members extending from said rails, a unit reflector element having tubular end portions supported on said tubular members, said reflector having curved portions which extend around sections of said heating element and which has a projecting portion which extends therebetween for protecting the one heating element section from the direct rays of the other section thereof, a supporting panel made up of spaced insulated metal members having insulating material disposed in the hollow interior thereof, and means for securing said rails to the panel for supporting a plurality of said heating assemblies thereon.

9. A heater element of the sheath-resistance type, comprising a sheath formed to have the ends adjacently disposed and bent at an angle to the main portion thereof, a coiled resistance wire within the sheath having straight sections at the ends, terminals connected to the straight end sections of the resistance wire, insulating material insulating the wire and terminal from the sheath, a cross bar extending between the sheath portions near the bent ends thereof for retaining the ends in fixed spaced relation to each other, a support for said element comprising a pair of spaced slotted insulating elements, said slots being oppositely presenting and one of said elements being movable, one of said slots receiving the cross bar of the heating element the other of said slots receiving the remote end portion of the heating element, said heating element being locked within the slots when said movable insulating element is moved away from the other insulating element, said slots permitting a substantial expansion of the heating element when locked therein, rails for supporting said insulating elements, and a pair of sockets mounted along one edge of the panel in position to be engaged by the terminal ends of the heating element.

10. A heater element of the sheath-resistance type, comprising a sheath formed to have the ends adjacently disposed and bent at an angle to the main portion thereof, a coiled resistance wire within the sheath having straight sections at the ends, terminals connected to the straight end sections of the resistance wire, insulating material insulating the wire and terminal from the sheath, a cross bar extending between the sheath portions near the bent ends thereof for retaining the ends in fixed spaced relation to each other, a support for said element comprising a pair of spaced slotted insulating elements in the slot in one of which the cross bar is disposed, in the slot of the other of which a remote portion of the sheath is secured to lock the element on the insulating supports against removal while permitting a substantial expansion thereof, spaced rails for supporting said insulating elements, a pair of sockets mounted along one edge of the panel in position to be engaged by the terminal ends of the heating element, and a trough in the edge of the panel along which the sockets are supported in which the conductors to the sockets are disposed in position to be insulated from the heat from the heating element.

11. In a heating device, a plurality of frame members, insulated structural members interconnecting the frame members, a plurality of heating panels supported by the structural members, said heating panels having one or more heating elements mounted on the inner face thereof, and a pantograph support at each end of the movable panels connected to the frame which permit the panels to be moved outwardly thereof while remaining parallel to all of its adjusted positions.

12. In a heating device, a plurality of frame members, insulated structural members interconnecting the frame members, a plurality of heating panels supported by the structural members, said heating panels having one or more heating elements mounted on the inner face thereof, a pantograph support at each end of the panel connecting the panels to the frame which permit the panels to be moved outwardly of the device, the opposite ends of said heating panels having locks mounted thereon containing a latching element, and keys insertable in said locks through the outer face of the panel for turning said latching element to released position, said locks retaining the keys fixed therein so that the panel may be moved to open position by a pulling force on the keys.

13. In a heating device, a plurality of frame members, insulated structural members interconnecting the frame members, a plurality of heating panels supported by the structural members, said heating panels having one or more heating elements mounted on the inner face thereof, a pantograph support at each end of the panel connecting the panels to the frame which permit the panels to be moved outwardly of the device, the opposite ends of said heating panels having spring pressed balls mounted thereon, and means on said frame engageable by said balls for retaining the panel in closed position while permitting the panel to be moved to open position when pressure is applied to the inner face of the panel.

14. In a heating device, a plurality of frame members, insulated structural members interconnecting the frame members, a plurality of heating panels supported by the structural members, said heating panels having one or more heating elements mounted on the inner face thereof, pantograph supports connecting the panels to the frame which permit the panels to be moved outwardly of the device, the opposite ends of said heating panels having locks mounted thereon containing a latching bar, keys insertable in said locks through the outer face of the panel for turning said latching bars to released position, said locks retaining the keys fixed therein so that the panel may be moved to open position by a pulling force on the keys, detents on said frame member engageable by said latching bars for securing the panels in closed position, and a spring on said detents which permits the latching bars to be released therefrom when internal pressure applies sufficient force on the inner face of the panel to force the detents from holding position and permit the panels to be moved outwardly to relieve the pressure.

15. In a heating device, a pair of frame members, structural members joining said frame members comprising insulated panel sections having a tubular member extending therethrough, means for securing the tubular members to the frame members, which members form conduits for electric conductors, panels for filling openings between the structural members made of spaced metal sheets providing a hollow interior containing insulating material, a pantograph support at each end of at least one panel and secured to the frame members for permitting the panel to be moved to and from alignment with the structural members, and latching means on the panel and frame for retaining the panel in closed position, which means are releasable when an opening force is applied to the panel.

16. In a heating device, a pair of frame members, structural members joining said frame members comprising insulated panel sections having a tubular member extending therethrough, means for securing the tubular members to the frame members, which members form conduits for electric conductors, panels for filling openings between the structural members made of spaced metal sheets providing a hollow interior containing insulating material, a pantograph support at each end of at least one panel having conductors therein and secured to the frame members for permitting the panel to be moved to and from alignment with the structural members, and separable terminals on said panel and frame member disposed in conductive relationship when the panel fills said opening and in separated relationship when the panel is moved from said opening.

17. In a heating device, a pair of frame members, structural members joining said frame members comprising insulated panel sections having a tubular member extending therethrough, means for securing the tubular members to the frame members, which members form conduits for electric conductors, panels for filling openings between the structural members made of spaced metal sheets providing a hollow interior containing insulating material, a pantograph support at each end of at least one panel and secured to the frame members for permitting the panel to be moved to and from alignment with the structural members, releasable latching means on the panel and frame for retaining the panel in closed position, and removable handle means insertable in said panel by which the panels may be pulled outwardly to release the latching means and be moved to open position.

18. In a heating device, an insulated supporting structure having removable panels therein, U-shaped heating elements of the sheath-resistance type each having spaced legs joined by an end loop mounted on certain of said panels in predeterminde relation to each other, unit double winged reflector elements of predetermined shape mounted about said legs and extending therebetween for reflecting the rays in a predetermined direction while shielding the legs from each other's rays.

19. In a heating device, an insulated supporting structure having removable panels therein, U-shaped heating elements of the sheath-resistance type each having spaced legs joined by an end loop mounted on certain of said panels in predetermined relation to each other, unit double winged reflector elements of predetermined shape mounted about said legs and extending therebetween for reflecting the rays in a predetermined direction while shielding the legs from each other's rays, the heat output of the portions of the heating element outside of the reflecting element being substantially less than the leg portions encompassed thereby.

20. In a heating assembly including, in combination, an insulated panel made of spaced sheets of metal, a plurality of sockets mounted along an edge of said panel, a plurality of hairpin-shaped heating elements having spaced leg portions joined by a loop portion, said heating elements being of the sheath-resisting type and having the end bent at an angle of substantially 90° with the leg portions, terminals on the ends of said bent ends, and a supporting element on said panel spaced from a pair of said sockets and having an aperture in which the loop portion of the heating element is pivotally disposed, said sloping ends and terminals moving directly into said sockets as the loop portion pivots in said supporting element.

21. In a heating assembly including, in combination, an insulated panel made of spaced sheets of metal, a plurality of sockets mounted near the upper edge of said panel, a plurality of hairpin-shaped heating elements having spaced leg portions joined by a loop portion, said heating elements being of the sheath-resisting type and having the end bent at an angle of less than 90° with the leg portions, terminals on the ends of said bent ends, and a supporting element on said panel spaced from a pair of said sockets and having an aperture in which the loop portion of the heating element is pivotally disposed, said sloping ends and terminals being disposed substantially on an arc struck from said loop portion to permit them to move directly into said sockets as the loop portion pivots in said supporting element.

22. In a heating assembly including, in combination, an insulated panel made of spaced sheets of metal, a plurality of sockets mounted near the upper edge of said panel, a plurality of hairpin-shaped heating elements having spaced leg portions joined by a loop portion, said heating elements being of the sheath-resisting type and having the end bent at an angle of less than 90° with the leg portions, terminals on the ends of said bent ends, a supporting element on said panel spaced from a pair of said sockets and having an aperture in which the loop portion of the heating element is pivotally disposed, said sloping ends and terminals being disposed substantially on an arc struck from said loop portion to permit them to move directly into said sockets as the loop portion pivots in said supporting element, and a movable element at the upper edge of the panel having an aperture in which said heating element is locked when said element is moved upwardly away from said spaced supporting element.

23. In a heating device, a plurality of frame members, structural members interconnecting the frame members, a plurality of heating panels supported by some of said members, some of said heating panels having one or more heating elements mounted on the inner face thereof, and a pantograph support at each end of certain of said panels and connected to certain of said members which permits a panel so mounted to be moved outwardly of the members while remaining parallel to all of its adjusted positions.

References Cited in the file of this patent

UNITED STATES PATENTS

| Number | Name | Date |
|---|---|---|
| 1,127,373 | Read | Feb. 2, 1915 |
| 1,359,400 | Lightfoot | Nov. 16, 1920 |
| 1,564,783 | Harris | Dec. 8, 1925 |
| 1,668,678 | Hassinger | May 8, 1928 |
| 1,934,438 | Macchi | Nov. 7, 1933 |
| 2,096,582 | Gough | Oct. 19, 1937 |
| 2,271,973 | Gilling | Feb. 3, 1942 |
| 2,271,977 | Hjelmgren | Feb. 3, 1942 |
| 2,423,184 | Greer | July 1, 1947 |
| 2,455,102 | Temple | Nov. 30, 1948 |
| 2,472,293 | Groven | June 7, 1949 |
| 2,504,516 | Goodell | Apr. 18, 1950 |
| 2,590,417 | Jones | Mar. 25, 1952 |
| 2,624,829 | Dzaack | Jan. 6, 1953 |
| 2,627,014 | Kolb | Jan. 27, 1953 |
| 2,667,563 | McOrlly | Jan. 26, 1954 |

OTHER REFERENCES

Miskella, "Infra-Red in Industry," published by the Miskella Infra-Red Co. (pages 11–13 and 19–25).

Ross, "Industrial Ovens," Bulletin 132 published by J. O. Ross Engineering Corp., 1948 (pages 7–11).

Kolb, "New Controlled Infra-Red Heat for Industry," A. I. E. E. Conference Paper, presented January 1950, received Mar. 7, 1950, 7 pages and 7 prints.